(12) United States Patent
Zhao

(10) Patent No.: US 11,726,842 B2
(45) Date of Patent: Aug. 15, 2023

(54) TECHNIQUES AND ARCHITECTURES FOR NON-BLOCKING PARALLEL BATCHING

(71) Applicant: Salesforce, Inc., San Francisco, CA (US)

(72) Inventor: Yingwu Zhao, Lafayette, CA (US)

(73) Assignee: Salesforce, Inc., San Francisco, CA (US)

( * ) Notice: Subject to any disclaimer, the term of this patent is extended or adjusted under 35 U.S.C. 154(b) by 64 days.

(21) Appl. No.: 15/226,685

(22) Filed: Aug. 2, 2016

(65) Prior Publication Data

US 2018/0039513 A1 Feb. 8, 2018

(51) Int. Cl.
*G06F 9/54* (2006.01)

(52) U.S. Cl.
CPC .................... *G06F 9/542* (2013.01)

(58) Field of Classification Search
CPC .............. G06Q 30/02; G06F 17/30303; G06F 17/30578; G06F 9/542; G06F 2201/835; G06F 2201/86
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |

(Continued)

OTHER PUBLICATIONS

Kleppmann, M., & Kreps, J. "Kafka, Samza and the Unix Philosophy of Distributed Data". 2015. IEEE Data Engineering Bulletin, 38 (4), 4-14. http://sites.computer.org/debull/A15dec/issue1.htm (Year: 2015).*

(Continued)

*Primary Examiner* — Wynuel S Aquino
(74) *Attorney, Agent, or Firm* — Kwan & Olynick LLP

(57) ABSTRACT

In an event-based data management system, an event having an associated identifier is received. A mapping operation is performed using the identifier to map the event to a selected one of a plurality of topic partitions. Queues for each of the plurality of topic partitions are managed. The queues for each of the plurality of topic partitions are managed independently of each other. The event is allocated to the selected topic partition based on the mapping operation. The event is placed into the queue for the selected topic partition. A batch of events is sent from the queue for the selected topic partition in response to one or more thresholds being reached.

20 Claims, 5 Drawing Sheets

(56) References Cited

U.S. PATENT DOCUMENTS

| | | |
|---|---|---|
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Camp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,581,227 B1 * | 8/2009 | Lawrence ......... G06F 17/30578 719/318 |
| 7,620,655 B2 | 11/2009 | Larsson et al. |
| 7,926,099 B1 * | 4/2011 | Chakravarty ........... G06F 9/542 726/13 |
| 7,945,813 B1 * | 5/2011 | Watson .................. G06F 9/542 714/18 |
| 8,707,316 B1 * | 4/2014 | Wang ..................... G06F 30/22 718/103 |
| 10,095,547 B1 * | 10/2018 | Kulkarni ................. G06F 9/455 |
| 10,356,150 B1 * | 7/2019 | Meyers ................ H04L 65/607 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0231647 A1 * | 12/2003 | Petrovykh ............... H04L 41/18 370/429 |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0005237 A1 * | 1/2005 | Rail ........................ G06F 16/93 715/234 |
| 2005/0021836 A1 * | 1/2005 | Reed ..................... G06F 9/542 709/204 |
| 2005/0050555 A1 | 3/2005 | Exley et al. |
| 2005/0091098 A1 | 4/2005 | Brodersen et al. |
| 2006/0225080 A1 * | 10/2006 | Nemirovsky ........... G06F 9/542 719/318 |
| 2008/0010641 A1 * | 1/2008 | Zhao .................. G05B 23/0264 718/101 |
| 2009/0070785 A1 * | 3/2009 | Alvez ..................... G06F 9/541 719/318 |
| 2009/0177744 A1 | 7/2009 | Marlow et al. |
| 2009/0313085 A1 * | 12/2009 | Bhogal .................. G06Q 30/02 705/347 |
| 2011/0016123 A1 * | 1/2011 | Pandey ............... G06F 16/2308 707/737 |
| 2012/0023369 A1 * | 1/2012 | Bourbonnais ........... G06F 9/466 714/16 |
| 2013/0060834 A1 * | 3/2013 | Paramasivam ......... H04L 12/66 709/202 |
| 2013/0290450 A1 * | 10/2013 | Butler .................... H04L 51/04 709/206 |
| 2013/0304826 A1 * | 11/2013 | Li ........................... H04L 51/14 709/206 |
| 2014/0101117 A1 * | 4/2014 | Uzzaman .......... G06F 17/30303 707/694 |
| 2015/0200886 A1 * | 7/2015 | Cuomo ............... H04L 67/1097 709/206 |
| 2015/0378796 A1 * | 12/2015 | Word ..................... G06F 9/546 709/203 |
| 2016/0117762 A1 * | 4/2016 | Ahmad .................. G06Q 50/12 705/15 |
| 2017/0097849 A1 * | 4/2017 | Lowery ................. G06F 9/4887 |
| 2017/0139956 A1 * | 5/2017 | Qiao ..................... G06F 16/11 |
| 2017/0199757 A1 * | 7/2017 | Fountain ............... G06Q 10/06 |
| 2017/0317935 A1 * | 11/2017 | Murthy .................. H04L 47/19 |

(56) References Cited

U.S. PATENT DOCUMENTS

2018/0159731 A1* 6/2018 Murthy ............... H04L 41/0806
2018/0365254 A1* 12/2018 Huang ................. G06F 9/4843

OTHER PUBLICATIONS

Confluent. "Introduction to librdkafka—the Apache Kafka C/C++ client library". Sep. 14, 2013. <https://docs.confluent.io/4.1.1/clients/librdkafka/INTRODUCTION_8md.html> (Year: 2013).*
Latchoumi, T. P. et al. "Secure Data Storage in Cloud Environment using MAS." Jun. 9, 2016. Indian Journal of Science and Technology 9.23. (Year: 2016).*

* cited by examiner

TECHNIQUES AND ARCHITECTURES FOR NON-BLOCKING PARALLEL BATCHING

TECHNICAL FIELD

Embodiments relate to event management in an event-based environment. More particularly, embodiments relate to techniques for efficiently managing data related to events from multiple sources.

BACKGROUND

Event-based environments manage data in response to events, some or all of which must be chronologically ordered. When an environment is responsible for data corresponding to a large number of events, management of that data can quickly become complex. Environments in which event-based data management quickly becomes complex can include, for example, a social media platform where many different parties and/or groups have independent feeds that can be interrelated and all be presented chronologically. Another example can include a sales environment in which information related to deals and/or the status of various components is tracked.

In these types of environments, data is continuously and rapidly pushed by many users to be stored in a backend storage system that can be remotely located across a network. Thus, a synchronous system can be quickly overwhelmed in an active environment.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
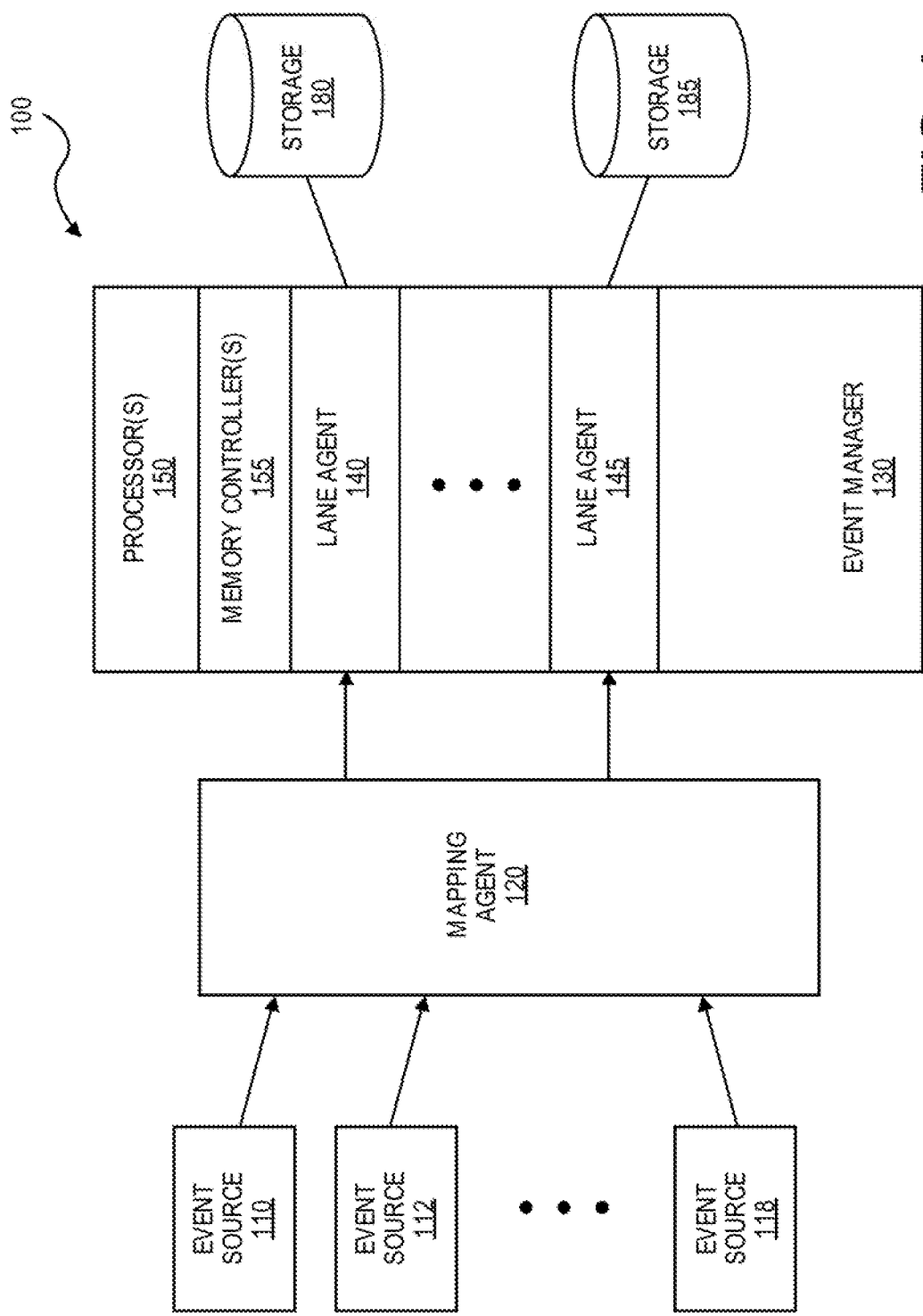
FIG. 1 is a block diagram of one embodiment of a parallel batching architecture.

In the following description, numerous specific details are set forth. However, embodiments of the invention may be practiced without these specific details. In other instances, well-known circuits, structures and techniques have not been shown in detail in order not to obscure the understanding of this description.

To address one or more of the shortcomings discussed above, batching and/or parallel operation can be supported. In one embodiment, event data can be topic-based and each topic can be assigned a topic partition that can be managed independently of other topic partitions. In one embodiment, different topic partitions can be associated with different backend storage solutions (e.g., relational database, non-relational database). In one embodiment, a multi-layer retry mechanism is provided to provide elastic load management.

In one embodiment, in order to provide sufficient scaling, not only is batching utilized, but also parallelism in order to configure and manage bandwidth to the storage system.

However, in an event-based environment, there is an order constraint posing difficulties to parallelism because dependent events must be processed in order. In one embodiment, an event is assigned a topic partition (aka, swim lane) in which data is inserted in the order in which it is received.

Various embodiments described herein conceptually operate utilizing the concept of a virtual swim lane. Within a swim lane, events that are received are processed in order, thus maintaining event ordering. However, swim lanes are independent of each other so that timing constraints are imposed between swim lanes. That is, an event in one swim lane may be received after an event in another swim lane but can be processes before.

In one embodiment, the event-based environment provides a number of "swim lanes" that topics/events are assigned to. In one embodiment, the topics/events are hashed into the swim lanes to help achieve a level of parallelism while satisfying ordering constraints. In some embodiments, the number of swim lanes can be configured when the environment is established or otherwise periodically modified. That is, the number of swim lanes can be generally static. In other embodiments, the number of swim lanes can be dynamically modified based on various factors. For example, an environment can be configured to 100 swim lanes to support an unlimited number of topics, each of which can be assigned to one of the swim lanes via, for example, hashing.

In one embodiment, each swim lane represents a channel or connection to one or more storage systems. This configuration allows control over the bandwidth to and from the storage system(s). Because the same topic is consistently hashed to the same swim lane, ordering of data and/or events is maintained for each topic, but data and/or events for different topics can be processed in parallel, which provides parallelism within the system.

In one embodiment, for each swim lane, data can be queued until the queue reaches one or more pre-selected thresholds (e.g., a pre-selected level and/or a pre-selected time has passed). In one embodiment, when one or more of these triggers are reached, data and/or events can be sent in bulk to the storage system(s). That is, the batching functionality can be controlled by size and/or time, both of which can be configurable. With these controls, data processing/storage latency and responsiveness can be controlled.

In one embodiment, when one or more of the thresholds is reached, a batch is handed over to another scheduler that is responsible to send the batch to the storage system(s) while the queuing system can continue to manage new events and data for subsequent batches.

In one embodiment, the system can track the number of outstanding outbound batches for each lane. In one embodiment, when the number of outstanding batches reaches a pre-selected threshold, the system can be stalled by denying access and/or new inputs to one or more lanes. In one embodiment, a configurable retry mechanism can be provided to slow down incoming events and/or data efficiently without shutting down access.

Because the retry mechanism is configurable and flexible, in high-load cases, users can experience a natural slow down and ramping back up again when the system recovers rather than being blocked from service. In one embodiment, the retry mechanism employs an exponential back off strategy. In another embodiment, the retry mechanism employs a Fibonacci back off strategy.

FIG. 1 is a block diagram of one embodiment of a parallel batching architecture. Architecture 100 can part of a single hardware computing device or can be distributed across multiple hardware computing devices.

In one embodiment, event sources (e.g., 110, 112, ... 118) can provide data and/or event information from one or more environments. For example, events can be comments and responses in a social media environment, sales events/activities, organizational changes, real-time environmental data, system data logging, etc. Event sources can be any hardware computing device or interface capable of receiving data corresponding to an event.

Mapping agent 120 operates to analyze event data and determine via an identifier or other indication an event to which the data corresponds. For example, in a social media setting, an initial post can be a new event and responses to the initial post are part of the event and should be processed in the correct order. As another social media example, creation of a profile can be a new event and posts within that profile can be considered part of the event and be processed in the correct order.

Mapping agent 120 operates to map event information to the appropriate lane agent (e.g., 140, 145). In one embodiment, mapping agent 120 performs this function by utilizing a hashing function or other mapping strategy. Mapping agent 120 causes the event-related data to be assigned to the proper lane agent in event manager 130.

In one embodiment, the lane agents manage queues for processing events/data from a specific event identifiers. That is, mapping agent 120 maps incoming events to lane agents through which the swim lane concept is managed/enforced. In one embodiment, the lane agents coordinate sending batches of data to corresponding storage devices (e.g., 180, 185). In one embodiment, data within a swim lane (as managed by a lane agent) is managed in batches by size and elapsed time, both of which can be configurable. For example, a queue depth of 50 events or 500 ms, which ever happens first, can be a trigger to process the batch. Additional and/or different characteristics can be used as triggers. Configuration of various triggers and thresholds can allow for optimization of latency and bandwidth.

In one embodiment, each lane agent is communicatively coupled with a corresponding storage device/partition. The storage device(s) can be individual storage devices (e.g., hard disks, flash drives, solid state devices), or they can be partitions or segments of storage devices so that multiple lanes can be serviced by a single physical device, or some combination thereof. Lane agents can operate independently of each other so that processing of different events can occur in parallel, which can improve system efficiency. In various embodiments, architecture 100 can include additional and/or different components, for example, processor(s) 150 and/or memory controller(s) 155.

In one embodiment, the storage devices can be different types of storage devices. For example, in an embodiment, one storage device can be a SQL database and another storage device can be an HBASE database. Any combination of storage structures can be supported.

Figure 2:
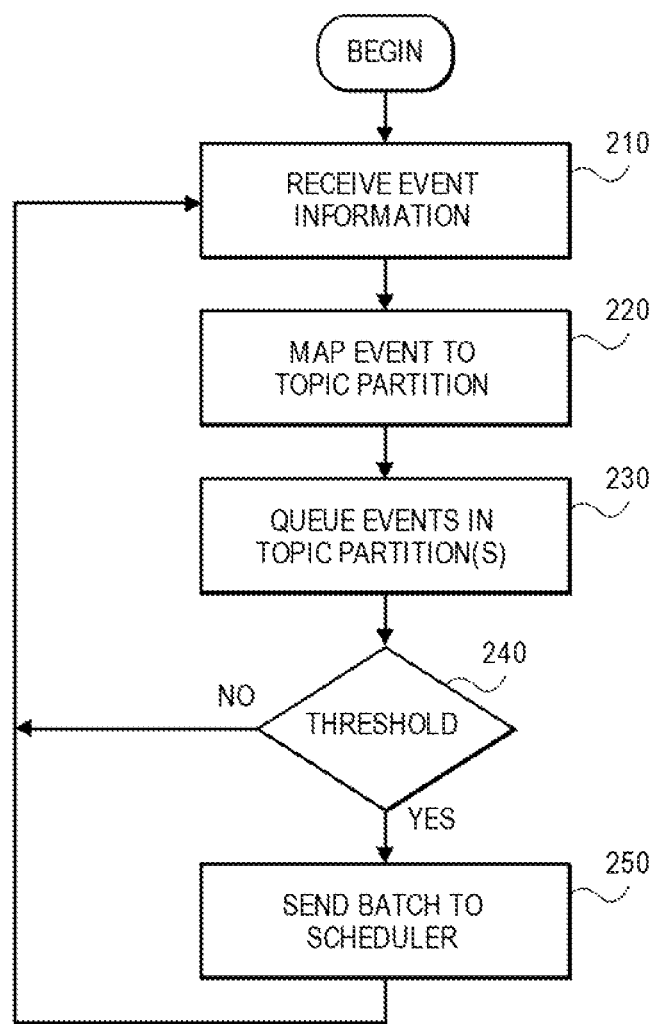
FIG. 2 is a flow diagram of one embodiment of a parallel batching technique.

FIG. 2 is a flow diagram of one embodiment of a parallel batching technique. The process described with respect to FIG. 2 can be performed, for example, by mapping agent 120 and or event manager 130 of FIG. 1. Other architectures can also be configured to perform the functions described with respect to FIG. 2.

Event information is received, 210. This event information can be received from, for example, one or more remote devices (e.g., tablet, desktop computer, smartphone, laptop computer). In one embodiment, the event information can be received by the host computing platform via an application program interface (API) configured to receive and process event information.

For example, a first electronic device can be used by a first user to post a comment to social media site and a second electronic device can be use by a second user to post another comment to the social media site. The comments can be received by the host computing platform and processed as described herein.

In one embodiment, the received events are mapped to a topic partition (swim lane), 220. In one embodiment, the mapping is accomplished by using a hashing function; however, other mapping strategies can also be utilized. As described above, each topic partition has a corresponding lane agent (topic partition agent) that receives the events of the topic partition and manages the processing of those events.

In one embodiment, the events are mapped to the topic partition, 220, by, for example the mapping agent of FIG. 1. In one embodiment, mapping is performed based on an event identifier or other information within the event.

In one embodiment, the lane agent manages the queuing of event for the corresponding topic partition, 230. As discussed above, any number of topic partitions can be supported and the topic partitions can be processed independently of each other. The lane agents function to manage the ordering (if necessary) and queuing of events for the assigned topic partition and can function without regard to the processing of events for other topic partitions handled by other lane agents.

If one or more thresholds have not been reached, 240, receiving and queuing of subsequent events occurs. If one or more thresholds have been reached, 240, events stored in the queue are batched and sent to a scheduler, 250, to be sent to storage. Because the lane agents do not manage the scheduling, queuing of events for the next batch is not stalled while the scheduling functionality is performed by the lane agent.

Figure 3:
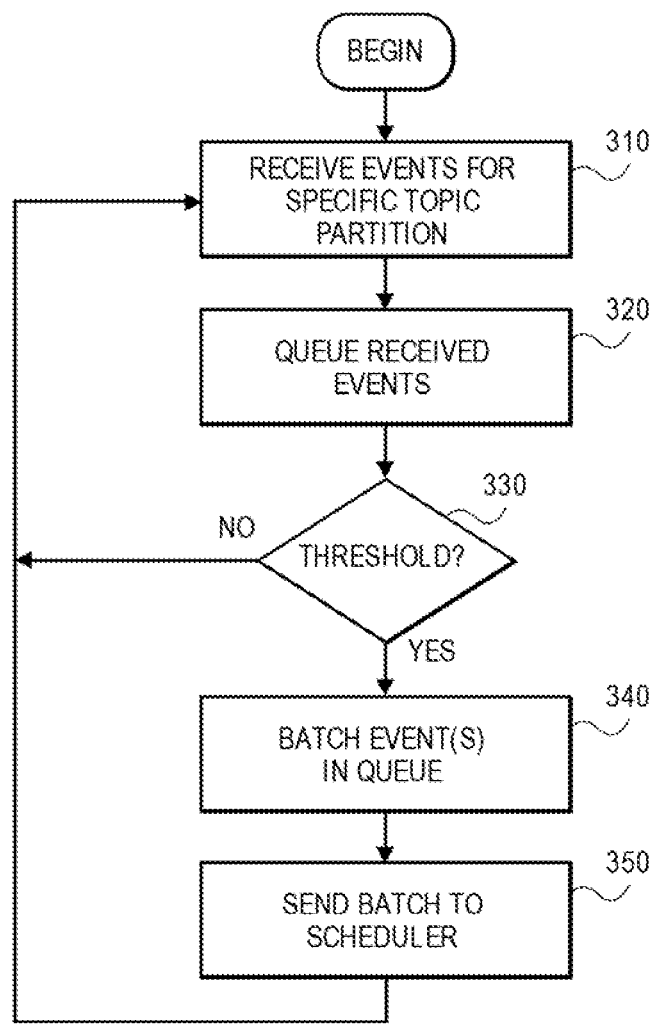
FIG. 3 is a flow diagram of one embodiment of a lane management technique.

FIG. 3 is a flow diagram of one embodiment of a lane management technique. The process described with respect to FIG. 3 can be performed, for example, event manager 130 of FIG. 1. Other architectures can also be configured to perform the functions described with respect to FIG. 3. Because the triggers that cause a batch to be dequeued can be based on time, queue size and/or other characteristics, the batch size may not be consistent, but may have a maximum allowable size.

Events are received for the specific topic partition (swim lane) being managed, 310. As discussed above, a mapping agent (or other entity) analyzes events to determine which topic partition should receive the event. This can be based on, for example, hashing an event identifier or other information. Topic partitions can be managed independently of each other.

The event manager queues the received events in the proper order, 320. Because events have a time based ordering, events should be queued in the appropriate order. If any adjusting of the ordering is necessary, the lane agent can adjust the ordering in the queue as necessary.

If one or more thresholds have not been reached, 330, receiving and queuing of subsequent events occurs. If one or more thresholds have been reached, 330, events stored in the queue are batched, 340. The batched events are then sent to a scheduler, 350, to be sent to storage.

Figure 4:
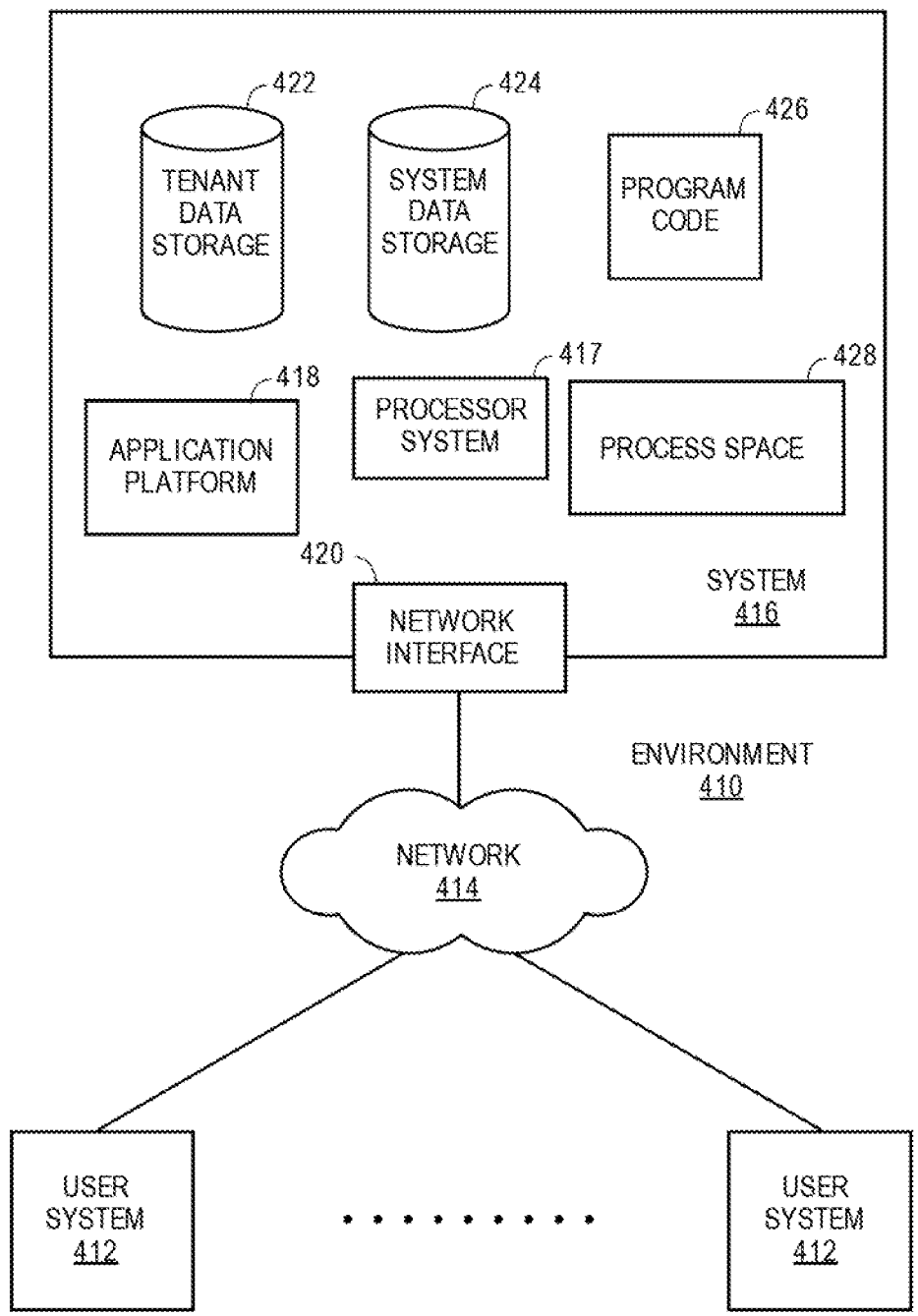
FIG. 4 illustrates a block diagram of an environment where an on-demand database service might be used.

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in herein FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
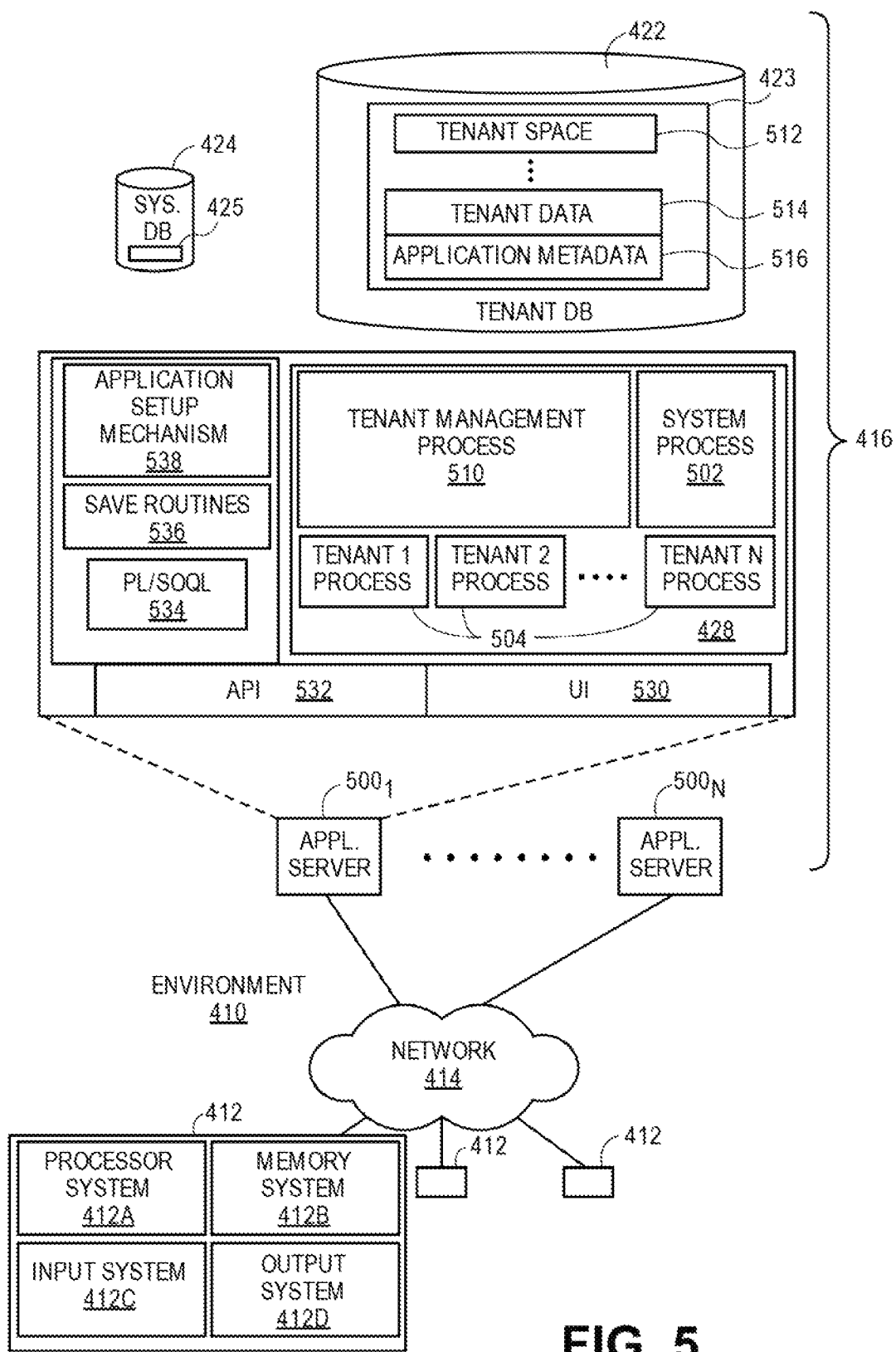
FIG. 5 illustrates another block diagram of an environment where an on-demand database service might be used.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1\text{-}400_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
receiving, via an interface, an event associated with a corresponding topic;
mapping, by a mapping agent, the event to a selected one of a plurality of topic partitions, the selected one of the plurality of topic partitions being associated with the corresponding topic, wherein events within each of the plurality of topic partitions are processed according to topic ordering constraint;
managing by one or more lane agents, for each topic partition of the plurality of topic partitions, a corresponding queue of a plurality of queues, each queue of the plurality of queues being communicatively coupled to and managed by a corresponding lane agent of the one or more lane agents, wherein the plurality of queues are managed independently from one another, each topic partition being associated with a corresponding one of a plurality of memory partitions of a storage system including one or more storage devices, the plurality of memory partitions being independent from one another;
placing, by the mapping agent, the event into a particular queue of the plurality of queues, the particular queue corresponding to the selected topic partition; and
coordinating a sending, by a particular lane agent of the one or more lane agents, of a batch of events from the particular queue for the selected topic partition to the corresponding memory partition, the particular queue being communicatively coupled to and managed by the particular lane agent, each lane agent being configured to coordinate sending event data from a corresponding queue of the plurality of queues to a corresponding memory partition, the particular lane agent being configured to coordinate sending event data from the particular queue.

2. The method of claim 1, the storage devices comprising at least two different types of storage structures.

3. The method of claim 1, the mapping comprising utilizing a hashing function.

4. The method of claim 1, wherein coordinating sending, by the particular agent, the batch of events from the particular queue for the selected topic partition comprises:
transmitting the batch of events from the particular queue to a scheduler operatively coupled to the memory partition corresponding to the selected topic partition.

5. The method of claim 1, further comprising:
detecting a trigger event;
wherein coordinating the sending of the batch of events is performed responsive to detecting the trigger event.

6. The method of claim 5, wherein detecting a trigger event comprises:
determining that the particular queue has reached a particular threshold.

7. The method of claim 6, the particular threshold being based on time.

8. The method of claim 6, the particular threshold being based on queue size.

9. A non-transitory computer-readable medium comprising computer program instructions, the computer program instructions configurable such that, when executed by one or more processors, the computer program instructions cause the one or more processors to:
process an event received via an interface, the event being associated with a corresponding topic;
map, by a mapping agent, the event to a selected one of a plurality of topic partitions, the selected one of the plurality of topic partitions being associated with the corresponding topic, wherein events within each of the plurality of topic partitions are processed according to topic ordering constraints;
manage by one or more lane agents, for each topic partition of the plurality of topic partitions, a corresponding queue of a plurality of queues, each queue of the plurality of queues being communicatively coupled to and managed by a corresponding lane agent of the one or more lane agents, wherein the plurality of queues are managed independently from one another, each topic partition being associated with a corresponding one of a plurality of memory partitions of a storage system including one or more storage devices, the plurality of memory partitions being independent from one another;
place, by the mapping agent, the event into a particular queue of the plurality of queues, the particular queue corresponding to the selected topic partition; and
coordinate a sending, by a particular lane agent of the one or more lane agents, of a batch of events from the particular queue for the selected topic partition to the corresponding memory partition, the particular queue being communicatively coupled to and managed by the particular lane agent, each lane agent being configured to coordinate sending event data from a corresponding queue of the plurality of queues to a corresponding memory partition, the particular lane agent being configured to coordinate sending event data from the particular queue.

10. The non-transitory computer-readable medium of claim 9, the storage devices comprising at least two different types of storage structures.

11. The non-transitory computer-readable medium of claim 9, the mapping comprising utilizing a hashing function.

12. The non-transitory computer-readable medium of claim 9, further comprising computer program instructions configurable such that, when executed by the one or more processors, the computer program instructions cause the one or more processors to:

coordinate sending the batch of events by transmitting the batch of events to a scheduler operatively coupled to the memory partition corresponding to the selected topic partition.

13. The non-transitory computer-readable medium of claim 9, further comprising computer program instructions configurable such that, when executed by the one or more processors, the computer program instructions cause the one or more processors to:

detecting a trigger event;

wherein sending the batch of events is performed responsive to detecting the trigger event.

14. The non-transitory computer-readable medium of claim 13, wherein detecting a trigger event comprises:

determining that the particular queue has reached a particular threshold.

15. A system comprising:

at least one memory system;

one or more processors coupled with the at least one memory system, the one or more processors configurable to:

process an event received via an interface, the event being associated with a corresponding topic;

map, by a mapping agent, the event to a selected one of a plurality of topic partitions, the selected one of the plurality of topic partitions being associated with the corresponding topic, wherein events within each of the plurality of topic partitions are processed according to topic ordering constraints;

manage by one or more lane agents, for each topic partition of the plurality of topic partitions, a corresponding queue of a plurality of queues, each queue of the plurality of queues being communicatively coupled to and managed by a corresponding lane agent of the one or more lane agents, wherein the plurality of queues are managed independently from one another and in parallel, each topic partition being associated with a corresponding one of a plurality of memory partitions of a storage system including one or more storage devices, the plurality of memory partitions being independent from one another;

place, by the mapping agent, the event into a particular queue of the plurality of queues, the particular queue corresponding to the selected topic partition; and coordinate a sending, by a particular lane agent of the one or more lane agents, of a batch of events from the particular queue for the selected topic partition to the corresponding memory partition, the particular queue being communicatively coupled to and managed by the particular lane agent, each lane agent being configured to coordinate sending event data from a corresponding queue of the plurality of queues to a corresponding memory partition, the particular lane agent being configured to coordinate sending event data from the particular queue.

16. The system of claim 15, the storage devices comprising at least two different types of storage structures.

17. The system of claim 15, the mapping comprising utilizing a hashing function.

18. The system of claim 15, the one or more processors further configurable to:

coordinate sending the batch of events by transmitting the batch of events to a scheduler operatively coupled to the memory partition corresponding to the selected topic partition.

19. The system of claim 15, the one or more processors further configurable to:

detect a trigger event;

wherein coordinating the sending of the batch of events is performed responsive to detecting the trigger event.

20. The system of claim 19, the one or more processors further configurable to:

a trigger event comprises:

detect the trigger event by determining that the particular queue has reached a particular threshold.

* * * * *